US008448183B2

(12) United States Patent
Dowlan et al.

(10) Patent No.: US 8,448,183 B2
(45) Date of Patent: May 21, 2013

(54) PRESENTATION LAYER APPLICATION INTEGRATION

(75) Inventors: Mark Jeffrey Dowlan, Victoria (AU); Saneel Vasram, Queensland (AU); Nick Shelomanov, Queensland (AU)

(73) Assignee: Accenture Global Services Limited, Dublin (IE)

( * ) Notice: Subject to any disclaimer, the term of this patent is extended or adjusted under 35 U.S.C. 154(b) by 1139 days.

(21) Appl. No.: 11/995,660

(22) PCT Filed: Jul. 14, 2006

(86) PCT No.: PCT/AU2006/000992
§ 371 (c)(1),
(2), (4) Date: Jun. 5, 2008

(87) PCT Pub. No.: WO2007/009162
PCT Pub. Date: Jan. 25, 2007

(65) Prior Publication Data
US 2009/0119679 A1      May 7, 2009

(30) Foreign Application Priority Data

Jul. 15, 2005    (AU) ................................ 2005903757

(51) Int. Cl.
*G06F 9/06*      (2006.01)
(52) U.S. Cl.
USPC ............ 719/313; 719/311; 709/203; 709/219
(58) Field of Classification Search
None
See application file for complete search history.

(56) References Cited

U.S. PATENT DOCUMENTS

| 6,006,228 | A | * | 12/1999 | McCollum et al. ................... 1/1 |
| 6,434,607 | B1 | | 8/2002 | Haverstock |
| 6,510,464 | B1 | | 1/2003 | Grantges, Jr. |
| 6,950,866 | B1 | * | 9/2005 | Lowry et al. ................... 709/223 |
| 7,523,395 | B1 | * | 4/2009 | Namait et al. ................ 715/255 |

(Continued)

FOREIGN PATENT DOCUMENTS

| JP | 2005-174120 A1 | 6/2005 |
| WO | 03104990 A1 | 12/2003 |

OTHER PUBLICATIONS

European Patent Office Supplemental Search Report for European Application No. 06760854.7 dated Sep. 30, 2009.

(Continued)

*Primary Examiner* — S Sough
*Assistant Examiner* — Syed Roni
(74) *Attorney, Agent, or Firm* — Harrity & Harrity, LLP

(57) ABSTRACT

A system for interfacing data between at least a first and a second software program, the system hosting the execution of the software programs and each software program respectively executing computer instruction code, the system including: a computing device operable by a user and with which the user submits authentication data, the computing device indicating the grant of access to the user of the first and second software programs upon independent verification of the user's credentials by the first and second software programs where verification is required; a first selector operable by the user to select data available to the first software program; a second selector operable by the user to initiate a first browser and causing the first browser to post the selected data; a receiver enabling the second software program to receive and process the posted selected data; and transmitter enabling the second software program to return the processed data to a second browser in a form readily receivable by the second browser.

26 Claims, 10 Drawing Sheets

U.S. PATENT DOCUMENTS

| | | |
|---|---|---|
| 2002/0010776 A1 | 1/2002 | Lerner |
| 2003/0182395 A1* | 9/2003 | Lynch et al. ............... 709/218 |
| 2003/0188260 A1 | 10/2003 | Jensen |
| 2004/0139154 A1 | 7/2004 | Schwarze |
| 2004/0226459 A1* | 11/2004 | Hill et al. ................ 100/116 |
| 2004/0254979 A1* | 12/2004 | Colling et al. ............. 709/203 |
| 2005/0055458 A1* | 3/2005 | Mohan et al. ............. 709/238 |
| 2005/0223392 A1* | 10/2005 | Cox et al. ................. 719/328 |

OTHER PUBLICATIONS

David Fuston, "Oracle9iAS Discoverer" [Online] Jun. 21, 2002, pp. 1-37, XP002541506, Retrieved from the Internet: URL:http://www.vlamis.com/Papers/odtug2002-1.pdf> [retrieved on Aug. 13, 2009].

* cited by examiner

PRESENTATION LAYER APPLICATION INTEGRATION

FIELD OF THE INVENTION

The present invention relates generally to the interfacing of data between software programs and more particularly, to a system, method and computer instruction code for interfacing data between software programs where a user of a software program requires data that is stored within or accessible to another software program in order for a task to be completed.

BACKGROUND OF THE INVENTION

Data is usually stored on disparate computer systems. Users operating one software program from time to time need to extract data from another software program to complete a required task. In most instances, the software application operated by the user contains at least some of the data required by the user for their purpose. However, it is a common requirement for the user operating a software application to obtain data from another software application in order to obtain all the data necessary for a task to be completed. For example, a user may be preparing a report by use of one software application that requires data to be imported from another software application to complete the report.

Usually, the operator of a software application seeks to obtain data from another system and extracts the data required from the other system for incorporation into the application operated by the user. Implementing this particular model requires the other system to be able to allow access by external users or external applications for the purpose of obtaining data from that system. To control such access, the software application that contains or controls access to data required by external users usually provides a secure interface wherein the external user or external application provides credentials that must be successfully authenticated to allow the first software application to gain access to the data controlled by the second application. However, by providing such a user interface, the software application incurs the usual risk associated with unauthorised users gaining access to the software application. Irrespective of the method implemented, the provision of an external secure access interface necessarily incurs the risk of eventual unauthorised access to the application.

Further, this model for sharing data necessarily requires the second application to understand the security model/structures of the first application to operate effectively. Where it is intended that authentication of a user's credentials by a first software application should also provide access to a second application, there is usually a replication of the security model by the second application. When replication of a security model occurs, there is an inherent risk that the separately stored models will not be maintained consistently for each software application. One particular example of the type of problem that can occur is where a user's security status is downgraded on a first system with the reduced security status not being correctly recorded in a second system. In this instance, although the user's ability to access data from a first software application executing on first system may be reduced, when accessing a second software application on a second system, the user may still be afforded access to data from that second software application that should not occur. Further, the restricted data may then be transferred to the first software application thus enabling the user to effectively circumvent their reduced security status on the first system. Of course, this type of security breach may be inadvertent on the part of the user but in any event, instances of this type continue to represent a significant problem.

The sharing of data between software programs and/or applications is implemented for a range of purposes, including sharing between applications in order to effect functions that are not available in one or other of the software applications. For example, one software application may contain the necessary data for a user to complete a task however, that software application may not be able to present the data in a format desired by the user. In these instances, another application may be used that is able to effect the layout format required and from within that software application access to the application containing the data is required in order to complete the task of obtaining and present the necessary data in a format required by the user. As it is unlikely that any software application will be able to effect all present and future format and presentation requirements of a user, sharing data between software applications remains a necessary requirement albeit a requirement that incurs the security risks mentioned previously.

Accordingly, it is an objective of the present invention to provide a system, method and computer instruction code for effecting data transfer between software programs that ameliorates the associated security risk.

Any discussion of documents, devices, acts or knowledge in the specification is included to explain the context of the invention. It should not be taken as an admission that any of the material formed part of the prior art base or the common general knowledge in the relevant field of technology on or before the priority date of the claims herein.

SUMMARY OF THE INVENTION

In one aspect, the present invention provides a system for interfacing data between at least a first and a second software program, the system hosting the execution of the software programs and each software program respectively executing computer instruction code, the system including: a computing device operable by a user and with which the user submits authentication data, the computing device indicating the grant of access to the user of the first and second software programs upon independent verification of the user's credentials by the first and second software programs where verification is required; a first selection means operable by the user to select data available to the first software program; a second selection means operable by the user to initiate a first browser and causing the first browser to post the selected data; a receiving means enabling the second software program to receive and process the posted selected data; and transmitting means enabling the second software program to return the processed data to a second browser in a form readily receivable by a second browser.

Of course, the first and second software programs could be executing on one or more host computers with a data communication network operably connecting each of the host computers such that data may be transferred between the programs. Alternatively, the first and second programs could be executing on the same host computer with the ability to transfer data between the first and second programs.

Whilst the computing device may include any device operable to connect to a computing system enabling a user to gain access to the first and second software programs, in another exemplary embodiment, the computing device is a personal computing device such as a laptop or similar personal workstation device for the user to gain access to a larger computing system. Further, the first and second software programs are preferably software applications operated by the user for the completion of specific tasks. In another exemplary embodiment, the first program is a software application that manages customer relationships and the second application is a document production application.

The first selection means includes any means that may be operated by the user to select data that is available to the first software program. In one example, this may include a selection means provided by the first software application that enables the user to select individual records or data fields. In another example, the selection means is a separate segment of computer code that is executed upon selection and which has the effect of executing a function that selects data that is available to the first application.

Further, the second selection means includes any means by which the user may initiate a browser and cause the posting of the selected data. In another exemplary embodiment, the second selection means is a software function identified by a user selectable device that is displayed upon a screen. In this embodiment, the user operates a mouse (or similar peripheral device) and places the cursor in the vicinity of the selectable device and selects same by operation of a mouse button. The operation of the device causes the instantiation of the first browser and the posting of the previously selected data. The selected data may be posted directly to the second software program or alternatively, the selected data may be posted to an intermediary processing agent before reaching the second software program.

The second software program includes a receiving means for receiving and processing the posted data and in another exemplary embodiment, the receiving means is a segment of computer code that upon execution enables same to receive and process the posted data. The processing of data by the second software application may include performing calculations or executing functions with respect to the posted data or simply reformatting the data. Similarly, during processing, data may be removed from, or added to, the posted data. In another exemplary embodiment, the precise operation of the segment of computer code is dependent upon the content of the posted data.

Similarly, the transmitting means enables the second software program to return the processed data to the second browser in a form readily receivable by the second browser and in another exemplary embodiment, the transmitting means is a segment of computer code that upon execution provides the requisite functionality. Of course, the first and second browsers could be the same type of browser or even the same instantiation of a browser. Further, in some exemplary embodiments, returning the processed data is referred to as "responding" to the initially posted data.

In one embodiment the first software program is a web browser based application or at least, an application operable to instantiate a browser application.

However, the second program could be any application operable to receive the data post from the first browser. In another exemplary embodiment, the data is posted from the first browser as an Hypertext Transfer Protocol (HTTP) post and the return processed data is returned from the second program as an HTTP response that may be in an Hypertext Markup Language (HTML) format.

The use of the HTTP post protocol is useful due to the prevalence of its use as a protocol for transferring data between computer systems. Increasingly, a secure form of HTTP (namely HTTPS) is being used and as the prevalence of use of the HTTPS protocol occurs, it is likely that the HTTPS protocol will become increasingly useful. In any event, a mutually recognisable format for the first and second program is required if posted data from the first program is to be received directly by the second program. Accordingly, where direct communication occurs, a commonly recognised and understood format is required. However, in one embodiment of the invention, a broker software application is used to receive posted data according to the format, structure or protocol of the first software program and subsequently forward posts data in a format structure/protocol that is readily recognised and receivable by the second software program.

In addition to posting selected data to a second software program, the first software program may also post processing instructions in addition to the data. These instructions may be used by the second software program and may be used to determine how the posted data should be interpreted and/or processed. Alternatively or additionally, the processing instructions may indicate the type of process, structure of data or how the destination system should respond as a result of receiving posted data. For example, the processing instructions forming part of the posted data may indicate to the second software program the required behaviour, style and/or colors that the second software program should use with respect to the data posted by the first software program.

In another exemplary embodiment, the data posted from the first software application also includes "return information" that includes instructions for the second software application with respect to where to "return" the user after processing is complete. For example, the "return information" may include session or state information that enables the second software program to return the user back to their departure point from the first software program. In another exemplary embodiment, the "returned information" also contains return processing instructions and details of the data to be returned from the second software program to the first software program.

Of course it will be recognized by those skilled in the relevant field of technology that a browser may be a standalone client program that offers only browser functionality or part of another program that provides functionality in addition to browser functionality. Further, a browser could reside as part of another program that embeds browser functionality within. Whilst it was previously mentioned that the HTTP/HTTPS response is preferably in the form of an HTML format, a typical browser will support a range of other content types in addition to HTML. For example, common content types include formats such as Joint Photographic Experts Group (JPEG), Portable Network Graphics (PNG) and Graphic Interchange Format (GIF) images. Of course it will be recognised that a browser can process scripting such as Visual Basic scripting and Java script contained within the content. The format supported in the functionality of the browser would normally be extended by the use of "plug-ins" and other software applications.

It will also be recognised by those skilled in the relevant field of technology that browsers also support downloading of content giving users the choice of where to save a file of the content that is returned as a response. Generally this occurs when the browser does not support the content type downloaded by the user. Further, browsers generally offer the user the option to process downloaded content immediately with other client applications or to save it for use at a later time.

According to further exemplary embodiments, the first software program posts data to multiple "second", or destination, software programs in order to effect a particular task. Similarly, in other embodiments, numerous "first" or source software programs post data to a single or multiple second, or destination, program(s).

In another aspect, the present invention provides a method of interfacing data between at least a first and second software program, each software program respectively executing computer instruction code, the method including the steps of: the user accessing a computer system and independently satisfying the security requirements to access both the first and second software programs where satisfying security requirements is required; the user operating the computer system to select data available to the first software program, said first software program in operable communication with a first browser; the first browser posting the selected data to the second software program, the second software program operable to receive the posted selected data contained in the posted message from the first browser; and the second software program processing the received data and returning processed data to the second browser in a form that the second browser can readily receive.

In another exemplary embodiment, the first and second software programs are separate software applications where it is useful to transfer data from the first software application to the second software application.

In a further aspect, the present invention provides a computer readable medium having stored thereon executable instructions for interfacing data between at least a first and second software program, each software program including executable instructions for executing tasks subsequent to a user accessing a computer system and independently satisfying the security requirements to access both the first and second software programs where satisfying security requirements is required; the first software program including executable instructions for, when executed: selecting data that is available to the first software program; transmitting selected data to a first browser and causing the first browser to post the selected data to the second software program; the second software program including executable instructions for, when executed: processing the posted selected data from the first browser and returning processed data to a second browser in a form that the second browser can readily receive.

The executable instructions may be implemented integrally to a computer or over a network using separate software components. The executable instructions may also include components of existing software that effect functions in cooperation with dedicated software developed specifically for the present invention.

The present invention ameliorates the inherent security risk associated with existing data storing arrangements between software programs by implementation of a "posting" arrangement that avoids the need to have a consistent security model applicable to all the software programs that are to store data and avoids any requirement for the software programs to have access to the data that is managed by any other software program.

Further benefits and advantages of the method, system and computer instruction code according to the present invention will become apparent to those of skill in the relevant field of technology in the following description of exemplary embodiments of the invention.

BRIEF DESCRIPTION OF THE DRAWINGS

Exemplary embodiments of the invention will now be described. The following description should not be considered to limit the scope of the invention or any of the preceding statements. The exemplary embodiments are described with reference to the accompanying drawings in which:

FIG. 1 is a diagrammatic illustration of two software applications and a posting of data there between;

DESCRIPTION OF EXEMPLARY
EMBODIMENTS OF THE INVENTION

Exemplary embodiments of the invention are described detailing the posting of messages from a first software program to a second software program. In various instances, the term "source application" is used as a synonymous term for "first software program" and the term "destination application" is also used as a synonymous term for "second software program".

Figure 1:
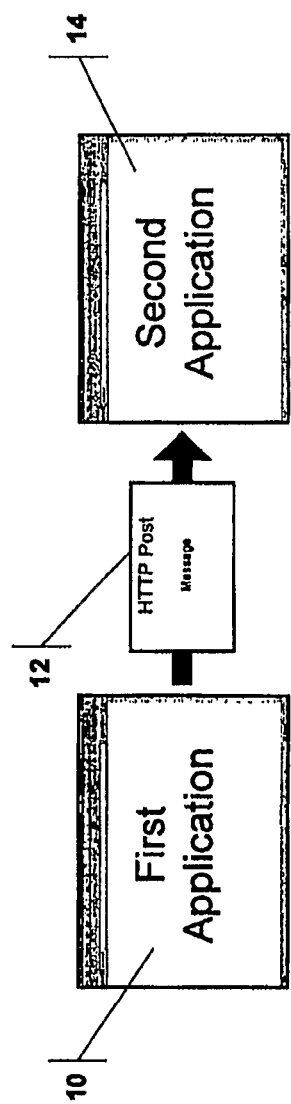

With reference to FIG. 1, a diagrammatic illustration of two software applications, namely a "first application" (10) and a "second application" (14) is provided detailing the posting (12) of a message containing data between the applications. In this respect, the message posted from the first application to the second application is in accordance with the HTTP protocol, although any suitable protocol may be used for this purpose. Further, throughout the description of the exemplary embodiments, any reference to HTTP should be considered to include the secure version of this protocol, namely, HTTPS. In the scenario illustrated in FIG. 1, a user has logged onto a computer system and accessed the first application and needs to perform or commence a transaction on the second application.

In the embodiment of FIG. 1, the first application (10) opens a new browser window and posts a message (12) to the second application (14).

Figure 2:
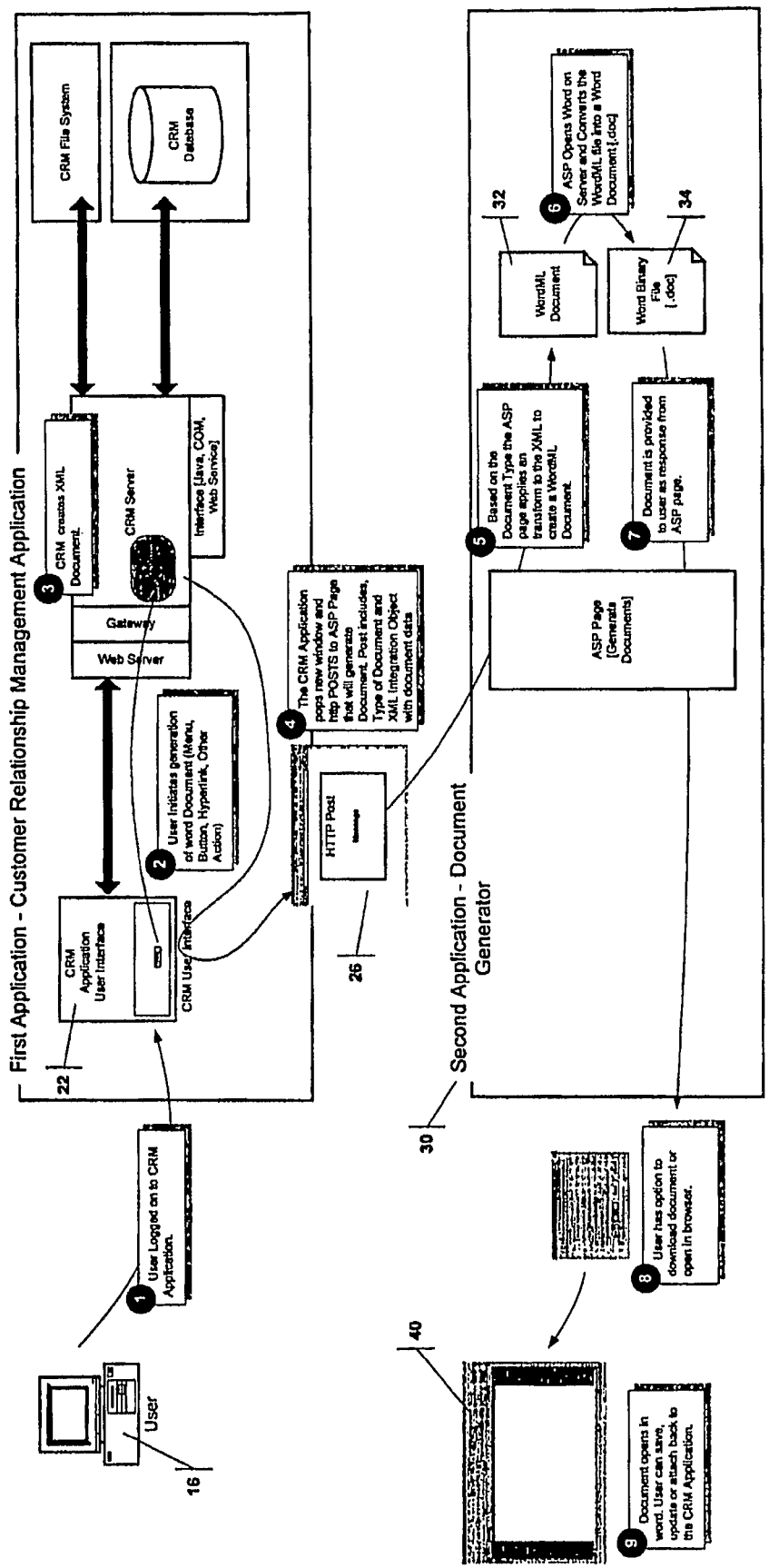
FIG. 2 is a diagrammatic illustration of the steps involved in generating a word document from a Customer Relationship Management (CRM) Software Application.

With reference to FIG. 2, a particular embodiment of the invention that enables the generation of a word processing document from another software application that performs CRM functions is detailed. In this particular example, the CRM software application does not have the facility to generate documents with a required format. In the particular instance of the embodiment detailed in FIG. 2, the CRM software (20) is operated by the user who requires the generation of a word processing document with the necessary format.

In the first step of the process, the user logs onto a personal computer terminal (16) and accesses the CRM software application (20) and is presented with the usual CRM user interface (22). At step 2 of the process, the user then selects data records from with the CRM application that they require to be included in a document. This step may involve the user selecting specific records or data fields or alternatively, may include the user selecting a function that has the effect of selecting a range of records or data fields as a results of executing that function. The user then navigates to and selects a document production view function. In the exemplary embodiment of FIG. 2, the document production view function is a custom configured function that is not provided as a standard function within the CRM software.

Figure 3:
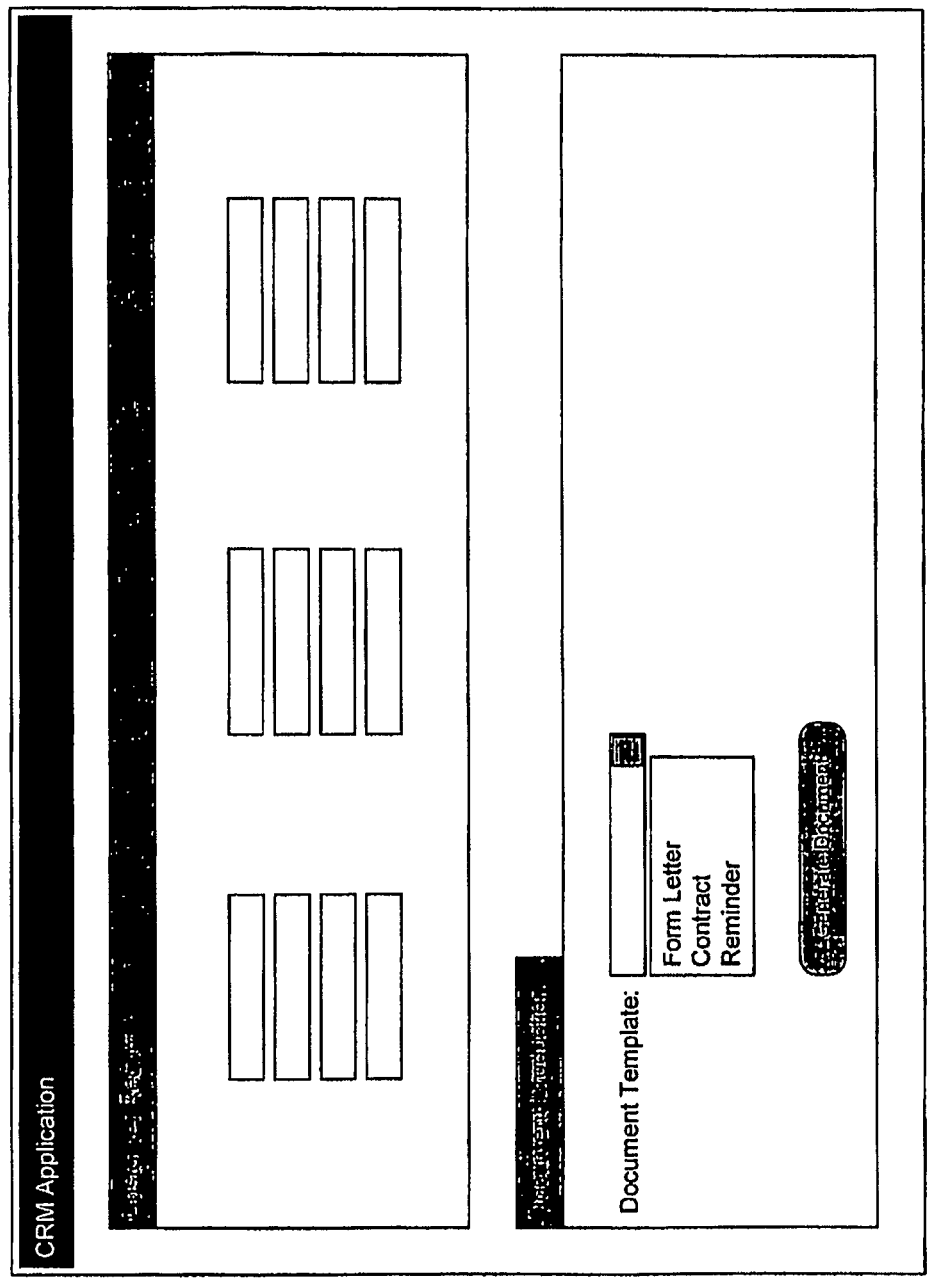
FIG. 3 is an illustration of a screen that would typically be displayed to a user during the process of selecting an opportunity record and navigating to a document production tab.

An exemplary embodiment of a user interface enabling a user to select records from the CRM software application and then navigate to and select a document production function is detailed in FIG. 3. In the particular screen shot detailed in FIG. 3, the user has selected the "opportunities" tab and subsequently selected the "template" option to reveal a drop down list of the available templates for the generation of the document. Having selected the required template, the user then selects the "generate documents" option to initiate the creation of the required document.

With further reference to FIG. 2, according to step 3 of the process, the CRM software application (20) acting as a first program then prepares a message to be posted to a second program (3). In this particular instance, the second program (30) is a custom built application developed using a language such as Active Server Page (ASP), Active Server Page Framework (ASPX) or JavaServer Pages (JSP) to generate word processing documents according to the required format. At step 3 of the process, the CRM software (20) instantiates an integration object (24) with data to populate the document. The type of document selected by the user determines the appropriate integration object (24) to use. The integration object (24) is then instantiated to contain the data to be interfaced to the second software program (30) based on the record selected in step 2 of the process. Further, the integration object (24) may be a custom object or a standard integration object provided as part of the CRM software application (20). The appropriate integration object for the type of document would typically be defined in a custom administration view for the CRM software application (20).

In any event, in the example of FIG. 2, the integration object is then streamed to XML to create the data section of the message to be posted to the second software program (30). In this example, the CRM software application (20) also adds processing instructions to the posted message. The processing instructions relate to the type of document to be created which was selected by the user in step 2.

At step 4 of the process, the CRM software application (20) then initiates a browser window (26) and posts a message to the second software program, namely, the document generator application (30). The URL for the second program (30) may be stored as a configurable item within the CRM software application (20). Once a message has been posted, the customer relationship software application (20) may process other tasks as it is not necessary to wait for the document generation process to complete.

At step 5 of the process detailed in FIG. 2, the second software program (30) receives the message posted from the first software application (20), namely, the CRM software application (20).

In this particular instance, the message contains data and processing instructions and the second software application (30) is a series of web based application pages that generate word processing documents. In the embodiment of FIG. 2, the ASP pages generate word processing documents by applying Extensible Stylesheet Language Transformation (XSLT) transformations to Extensible Markup Language (XML) data to create Word Processing Markup Language (WordML). The WordML document is a format that is an acceptable and receivable format to the Microsoft Word 2003 software application and accordingly, the Microsoft Word application may then accept the WordML document and generate a ".doc" file. Based upon the processing instructions contained in the posted message, the ASP application determines which XSLT transform to use. The ASP application then applies the XSLT transform to the data in the message to generate the WordML document (32).

At step 6 of the process of FIG. 2, the ASP application then opens the WordML document (32) using Microsoft Word 2003. The document is then saved in the usual Word ".doc" format (34).

At step 7 of the process of FIG. 2, the ASP application then returns the Word document to the user using the HTTP protocol. In the browser window (26) that was opened in step 4 of the process, the user is provided with the option to download the document.

At steps 8 and 9 of the process detailed in FIG. 2, the user is provided with the option to download the document or open same in a browser window and at step 9, upon opening the document in the Microsoft Word application (40), the user can elect to save the document as a separate document and then may update or associate the document with the CRM software application (20).

Figure 4:
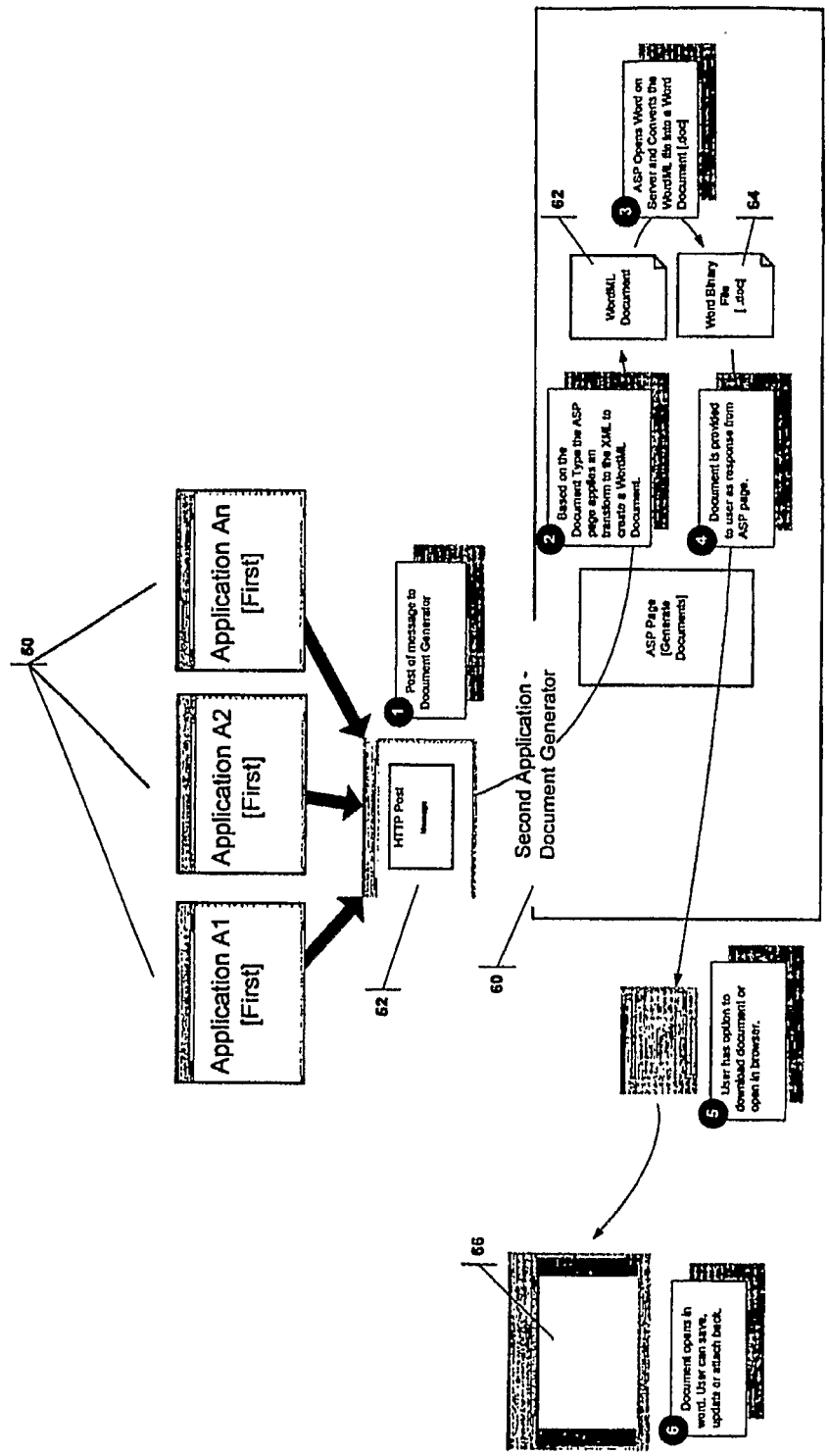
FIG. 4 is a diagrammatic illustration of the steps involved in arranging document production from multiple software applications.

With reference to FIG. 4, a diagrammatic illustration of the steps involved in arranging document production for multiple software applications is provided. This particular embodiment has an extension upon the embodiment detailed in FIG. 2 and in this instance, the document production destination application is used by more than one source application. For example, if all the source applications can open a browser window and post the same (or similar) messages then the destination application may be used repeatedly to perform the same function.

In the embodiment of FIG. 4, a user may be using one of a number of source applications (A1, A2 . . . An) which may be commercial off the shelf products or custom built applications. The source applications may be "web based" or "thick client" applications. The only limitation applying to any of the source applications is that the application should be capable of opening a browser window, and able to post data. Further, a browser must be able to display the content returned from the destination application.

At step 1 of the process detailed in FIG. 4, the user of a source application (A1, A2 . . . An) (50) prepares a message to be posted to the document generator application (60). In this embodiment, the document generator application is a series of ASP pages that generate Word documents using Microsoft Word 2003. Further, where the message to be posted to the document generator application (60) is based upon the type of document selected by the user, the message may contain the data to create the documents and also include additional processing instructions. The source application (50) may open a separate browser window (52) and post the message to the document generator application (60). Once the message has been posted, the source application (50) can be used to undertake further processes and tasks and does not need to wait for the document generation to complete.

In the instance that a separate browser window is not opened by the source application (50), then the document generator application (60) may reside in the current browser and effectively assume control from the source application (50).

At step 2 of the process detailed in FIG. 4, the document generator application (60) receives the message posted from the source application (50). The ASP pages of the document generation application (60) generate Word documents by applying XSLT transformations to XML data to create WordML. As before in the example of FIG. 2, based upon the processing instructions, the ASP application determines which XSLT transform to use. Accordingly, the document generator application (60) then applies the XSL transform to the data of the message to generate the WordML document (62). At step 3 of the process of FIG. 4, the ASP application then opens the Microsoft Word processing application and converts the WordML file (62) into a standard Word format document (64).

At step 4 of the process of FIG. 4, the ASP application then returns the Word document (64) to the user using the HTTP protocol. At step 5 of the process, the user is provided with the option to download the document or to open the document in a browser and at step 6, the document is opened in the Microsoft Word application with the user presented with the usual Word interface (66), and subsequently, the user can elect to save then update or associate the document with a source software application.

Figure 5:
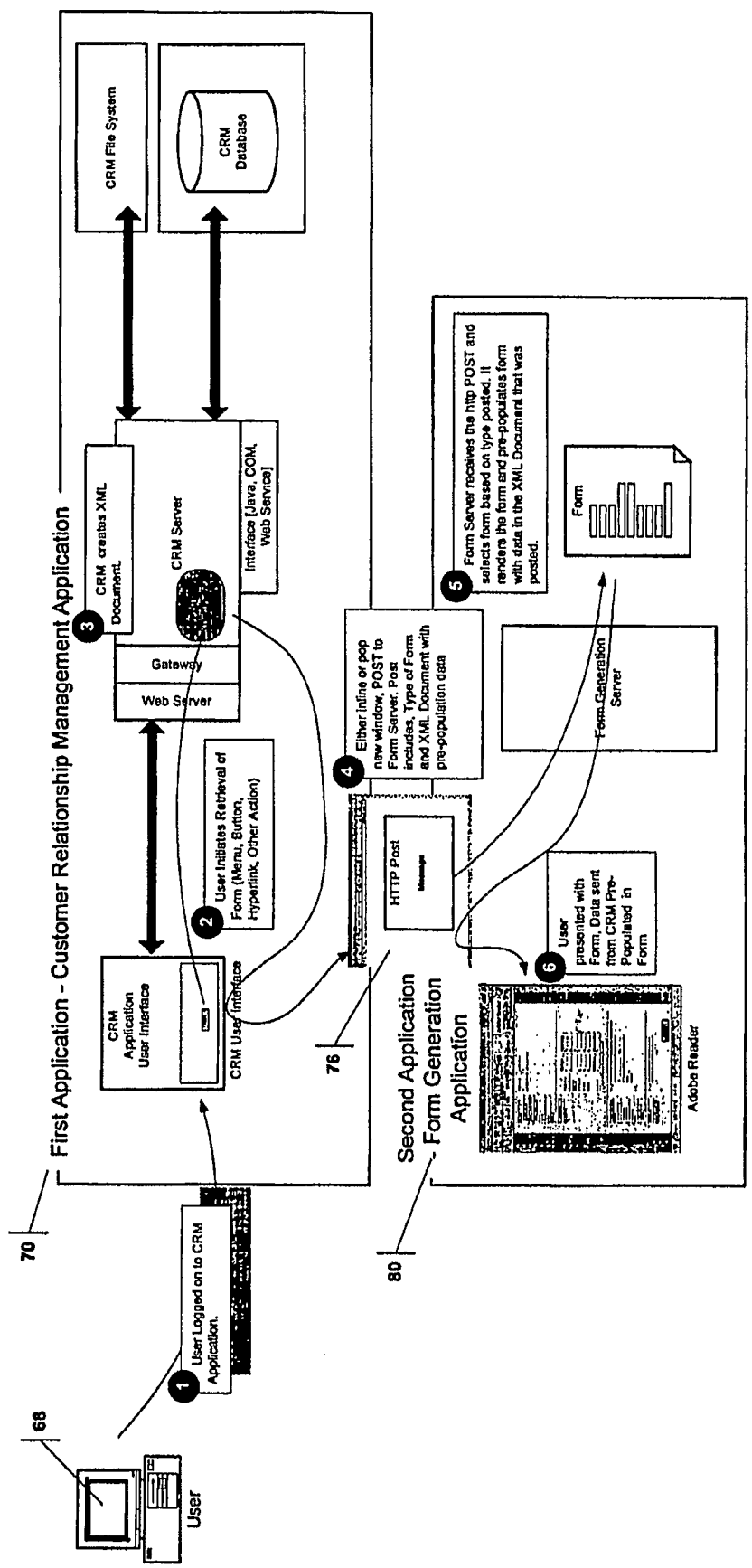
FIG. 5 is a diagrammatic illustration of the steps involved in interfacing data between two software applications, namely, a Customer Relationship Management Software Application and a Forms software application, in order to populate forms of the Forms software application by transfer of data from the CRM software application.

With reference to FIG. 5, a diagrammatic illustration of the steps involved in interfacing data between two software applications in order to populate forms of one software application by transfer of data from another software application is provided. In the particular embodiment detailed in FIG. 5, the method detailed is used to pre-populate forms from a CRM software application. In this particular embodiment, the first program (70) is a CRM software application and the second program (80) is a Form Server application.

At step 1 of the process of FIG. 5, a user logs onto the CRM application (70), by use of a personal computer workstation (68), the CRM application (70) being the source application in this instance. At step 2 of the process, the user selects records that are required to pre-populate a form and then selects an "electronic form view" option. As the CRM software application (70) does not usually provide this particular functionality, the "electronic form view" selection tab would most likely be a custom configured tab in the usual CRM user interface (72) that is presented to the user as a selectable option.

Selecting the "electronic form view" tab enables the user to select the type of form that they require. The available types of forms may be established in a custom CRM administration view. Further, the selection available would most likely be dependent upon the type of record that a user had selected from with the CRM software program (70). At this stage of the process, having selected records that are required to be used to pre-populate a form, the user then selects an "open electronic form" option to initiate the creation of the required form.

At step 3 of the process of FIG. 5, the CRM software application (70) then prepares a message to be posted to the Form Server application (80). In this instance, the message is based upon the type of form selected by the user which determines the appropriate CRM integration object (74) to use. The appropriate integration object is instantiated based upon the record selected in step 2 of the process of FIG. 5. The integration object (74) contains the data to be interfaced and may be a custom integration object, or a standard integration object, provided as part of the CRM software application (70). The appropriate integration object for the type of document is preferably defined in the custom CRM administration view.

The integration object (74) is then streamed to XML to create the data section of the message for the Adobe Forms Server application (80). The CRM software application (70) may then add processing instructions to the message and in this example, the processing instructions may relate to the type of form to be created.

At step 4 of the process of FIG. 5, the CRM software application (70) then opens a separate browser window (76) and posts the message to the Forms Server application (80). The URL for the Form Server application (80) may be stored as a configurable item within the CRM software application (70). Once the message has been posted, the CRM software application (70) may be used to process other tasks and does not need to wait for the form generation to complete, as this task may be performed by a separate process to the CRM software application (70).

At step 5 of the process of FIG. 5, the Form Server application (80) receives the message posted from the CRM software application (70) containing data and processing instructions. The Form Server application (80) is a commercially available product that serves PDF forms to a user and can pre-populate the form based upon data with which it has been provided. The forms used by the Form Server application (80) have been configured by the developers to meet specific business requirements. Based upon the processing instructions received in the posted message, the Form Server application may then determine the type of form to use and then apply this information to open a form and pre-populate same with the data contained in the message.

At step 6 of the process of FIG. 5, the Form Server application (80) then transmits the form with pre-populated data back to the user. The form may be opened in a browser window and from this application, the user may elect to save the form locally.

Figure 6:
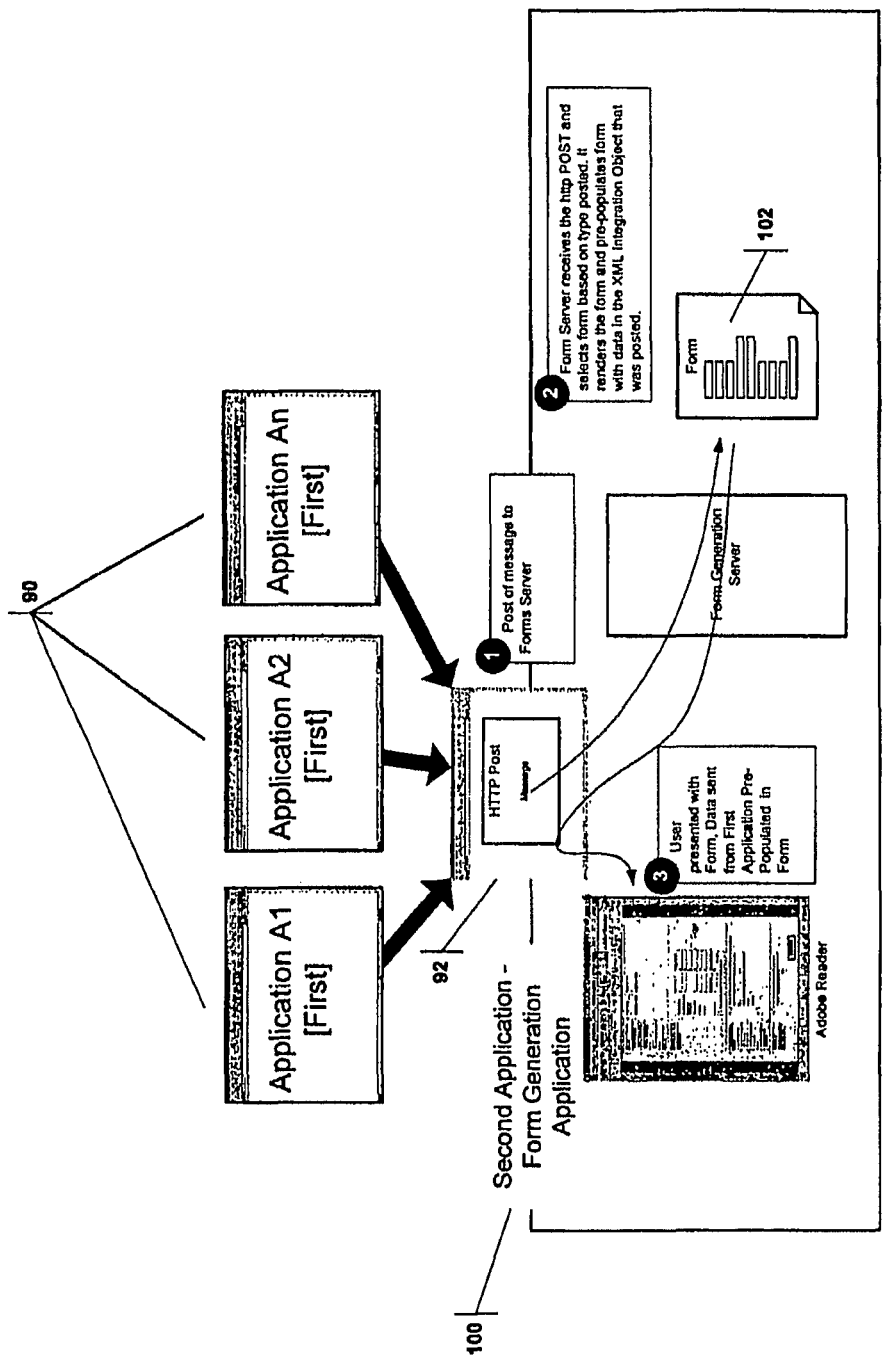
FIG. 6 is a diagrammatic illustration of the steps involved in populating forms contained within one software application from data obtained from multiple software applications.

With reference to FIG. 6, a diagrammatic illustration of the steps involved in populating forms contained within one software application from data obtained from multiple software applications is provided. This particular embodiment is an extension of the embodiment detailed in FIG. 5 and in this instance, the Forms Server application (100) (acting as the destination application) is used by more than one source application (90). If all the source applications are operable to open a browser window and post the same (or similar) message, then the destination application may be used repeatedly to perform the same function.

At step 1 of the process of FIG. 6, at the request of a user, a source application (A1, A2 ... An) (90) prepares a message to be posted to the Form server application (100). Typically, the message would be based upon the type of documents required and selected by the user. The message contains the data to create the document and may include processing instructions to indicate any particular requirements with respect to processing of the data by the Form Server application (100). The source application (90) may then open a separate browser window (92) and post a message to the Form Server application (100). Once a message has been posted, the source application (90) may be used to process other tasks as it may not be necessary to wait for the Form Server to complete the form generation process which may be performed as a separate process and displayed to the user in a window separate to the source software application.

At step 2 of the process of FIG. 6, the Form server application (100) receives the message posted from the source application (90). The message contains data and processing instructions and based upon the processing instructions, the Form Server application (100) can determine the type of form that is required. The Form Server application (100) then applies and opens the form (102) and pre-populates same with the data provided in the posted message.

At step 3 of the process of FIG. 6, the Form Server application (100) then transmits the form with pre-populated data back to the user. The form may be opened in a browser window and the user may subsequently elect to save the form locally.

Of course, it will be recognised by those skilled in the relevant field of technology that there are potentially a large of range of source and destination applications that could be used with the system and method of the instant invention. In particular, an exemplary embodiment where the CRM software application is the Siebel CRM software application and the Forms server is the Adobe Forms server application has been found to be particularly useful. Typically, users would require applications that are service type applications such as those used to generate documents or open forms etc. However, the destination application may be transaction based such as those that are used to submit requests or orders such as orders for goods and/or services.

Other examples of destination applications include:
  fax generation—in this instance the message may include data for a facsimile generating application that formats a facsimile. This may be sent to a recipient's facsimile machine and the user receives a message that the facsimile has been sent;
  email generation—in this instance, a message may be sent to an email generation application that formats an email message and then transmits same to a recipient's email address, the user receiving a message that the email has been sent;
  transaction processing—the message may be sent to a transaction type application such as an ordering system and may contain the details of an order that a user has selected using a "shopping cart" application. The destination application in this case may be an order form application that receives the order, processes same and returns an order number to the user. Other similar transaction applications include payment processing, request for information, creation of a service request, creation of a complaint submission, document printing for specific types of documents such as licenses, cheques etc or submission of information;
  specialised printing applications—in this instance the message may be used to create a specialised print job which may be printed by the user or transmitted to a central queuing arrangement for eventual submission to a particular printing apparatus.

Figure 7:
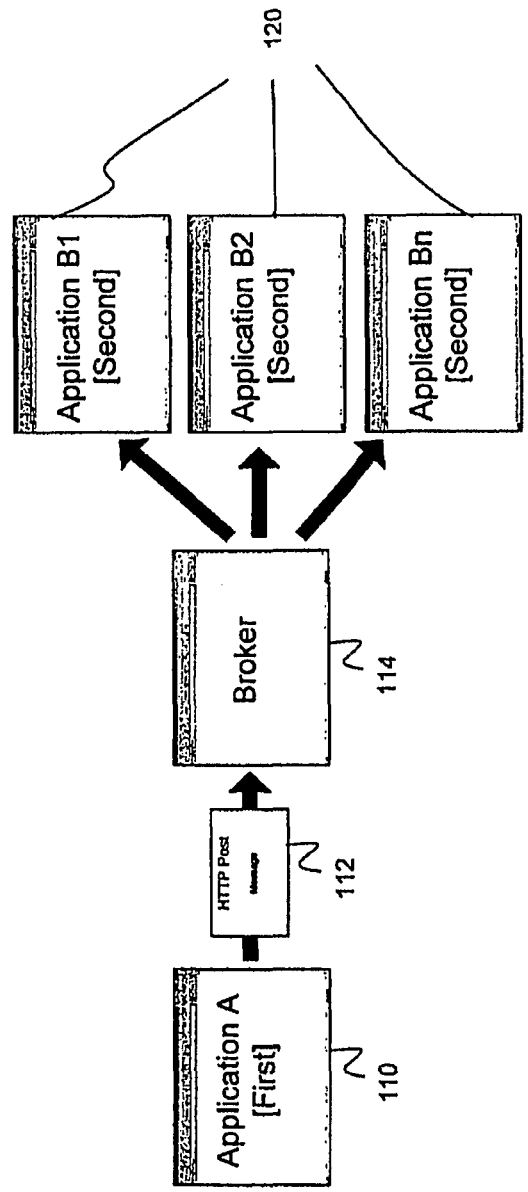
FIG. 7 is a diagrammatic illustration of an embodiment of the invention where a broker software application resides between the first software program and the second software program.

With reference to FIG. 7, diagrammatic illustration of an embodiment of the invention where a broker software application resides between the first software program and the second software program is provided. In this embodiment, the broker is used to mediate the message before it is passed from the source application (110) to the destination application(s) (120). The broker 112 may be used to allow a single message to be redirected to one of a range of destination applications (120) based upon the data and/or instructions included in a posted message (112). Alternatively, the broker (112) may be used to transform the message and/or format, structure or protocol of the message (including both data and/or instructions) before subsequent transmission to destination application(s) (120).

In the first example, the source application (110) generates a message and transmits same to the broker application (114). The broker application (114) will typically be an ASP page and would then redirect or repost the information to the appropriate destination application(s) (120). Usually, the broker application (114) would use the information contained in the message to determine which destination application(s) (120) to which the message should be redirected.

A particular example, involving the use of a broker application includes a user browsing through a shopping catalogue and seeking to place an order. In this example, the user may select which supplier they wish to place the order with and, the broker application may send the same order to different suppliers depending upon the order processing instructions contained within a posted message.

Figure 8:
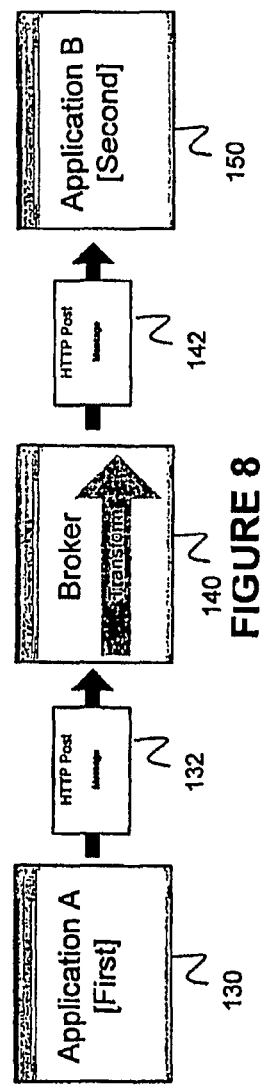
FIG. 8 is a diagrammatic illustration of a broker software application that performs a transform with respect to data posted from the first software program to the second software program.

In the case of the broker application performing a transform, this embodiment is better illustrated in FIG. 8. In this particular embodiment, by transforming the message (132), the broker application (140) assists the process of coupling source (130) and destination applications (150) as the transformation performed by the broker application (140) may be used to change a posted message (132) in such a way that it may be processed by any destination application (150).

Figure 9:
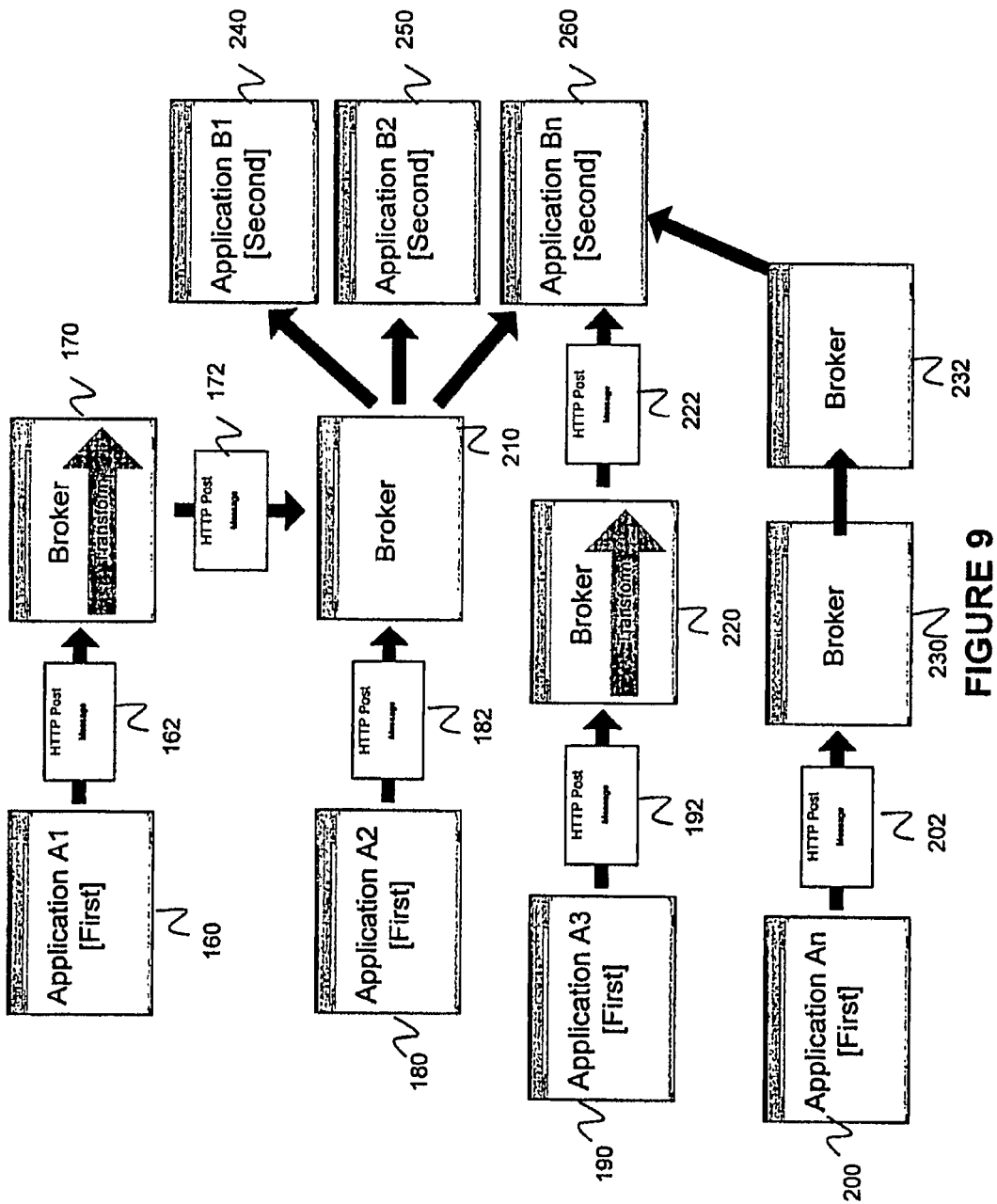
FIG. 9 is a diagrammatic representation of an embodiment using a range of broker software applications some of the broker application performing transforms whereas other broker applications merely redirect messages to one of a range of second software programs.

With reference to FIG. 9, a diagrammatic illustration of an embodiment using a range of broker software applications is provided. In FIG. 9, some of the broker applications perform transforms whereas other broker applications are merely used to redirect messages to one of a range of destination applications. The embodiment illustrated in FIG. 9 effectively represents a combination of the two embodiments illustrated in FIGS. 7 and 8.

Figure 10:
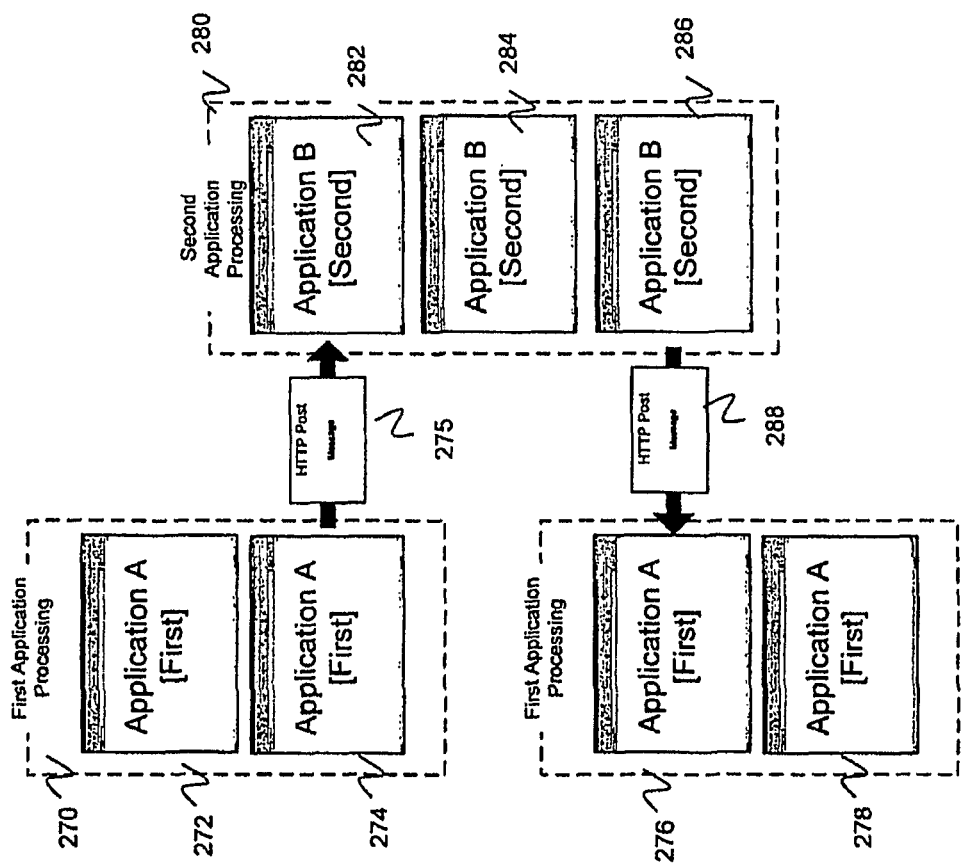
FIG. 10 is a diagrammatic illustration of a "return" from a second software program to a first software program subsequent to the processing of data by the second software program.

With reference to FIG. 10, a diagrammatic illustration of a "return" from a destination application (or second software program) to a source application (or first software program) subsequent to the processing of data by the destination application is provided. In this particular embodiment, the source application (270) creates a message for the destination application and in addition to data and instructions contained in the message for use by the destination application (280), the message also contains "return" information. The "return" information may include specific instructions for the destination application (280) to allow it to return the user, after the completion of processing, to the point that they departed from the source application (270). This "return" information may include address information in addition to user session or state information.

With reference to FIG. 10, the source application (272) is operated and data is selected for posting. Some time later, the source application (274) posts a message (275) to the destination application (282).

The destination application (282) then receives the message and commences processing (284). Depending upon the application, the user may be presented with one or more browser pages and once the destination application is finished processing (286), it constructs a message to be posted back (288) to the source application (276). This message (288) may contain additional data or information to be returned to the source application (276).

The destination application (286) then posts a message (288) to the original source application (276) and in the example of FIG. 10, a new browser window is not opened and the user makes use of the same browser window that they were using for the source application. This approach provides the appearance to the user that the integration of data from the destination application (280) was a seamless process and did not include an awareness on the post if the user that data was obtained from the destination application (280).

The source application (276) then receives the message and continues processing (278) where the user departed from the source application (274). Of course, as will be recognised by those skilled in the relevant field of technology, the source application 270 is represented diagrammatically as residing in different states at 272, 274, 276 and 278. Similarly, the destination application 280 is represented diagrammatically as residing in different states at 282, 284 and 286.

It will also be appreciated by those skilled in the relevant field of technology that the present invention is not limited in scope to any exemplary embodiment but rather, the scope of the present invention is broader so as to encompass other forms of the apparatus.

What is claimed is:

1. A system for interfacing data between at least a first software program and a second software program, the system hosting an execution of the software programs and each software program respectively executing computer instruction code, the system including:
   a computing device operable by a user of the software programs and with which the user submits authentication data, the computing device indicating grant of access to the user upon independent verification of the user's credentials by the first and second software programs where the verification is required;
   the first software program including:
     a first selection means operable by the user to select data available to the first software program;
     a second selection means operable by the user to initiate a first browser and causing the first browser to post the selected data;
   the second software program including:
   a server component including a receiving means enabling the second software program to receive the posted selected data, the receiving means identifiable by the first software program, wherein the posted selected data includes processing instructions that determine the operation of the second software program;
   a processing means, enabling the second software program to process the posted selected data and to generate documents via a data processor by applying a language transformation to a markup language based upon the processing instructions included in the selected posted data; and
   a transmitting means enabling the second software program to return the processed data to the first browser in a form readily supported by the first browser.

2. A system according to claim 1 wherein the first and second software programs execute on one or more host computers with a data communication network operably connecting each of the host computers such that data may be transferred between the first and second programs.

3. A system according to claim 1 wherein the first and second software programs execute on a single host computer.

4. A system according to claim 1 wherein the first software program is a web browser-based application.

5. A system according to claim 1 wherein the selected data is posted from the first browser as a Hypertext Transfer Protocol (HTTP) post.

6. A system according to claim 5 wherein the processed data returned from the second software program is returned to the first browser as an HTTP response.

7. A system according to claim 1 wherein the posted selected data from the first software program includes processing instructions that determine the operation of the second software program.

8. A system according to claim 1 wherein the data posted from the first software program to the second software program includes return information that includes instructions for the second software application with respect to how to return the user to the first program.

9. A system according to claim 8 wherein the return information includes state information thus enabling the second program to return the user to the departure point of the first program.

10. A system according to claim 1 wherein the second program includes two or more separate second applications and wherein the first software program causes the posting of data to each of the two or more separate second applications.

11. A system according to claim 1 wherein the first software program includes two or more separate first applications and wherein the two or more separate first applications cause the posting of data to the second software program.

12. A system according to claim 1 wherein the data posted from the first software program is posted to a broker application which receives the data and processes same before subsequently posting the data to the second software program.

13. A system according to claim 12 wherein the processing of data by the broker application places the data in a format suitable for receipt by the second software program.

14. A method of interfacing data between at least a first and second software program, each software program respectively executing computer instruction code, the method including:
    accessing, by a user, a computer system and independently satisfying security requirements to access both the first and second software programs where satisfying security requirements is required;
    operating, by the user, the computer system to select data available to the first software program, said first software program in operable communication with a first browser;
    posting, via the first browser, the selected data to the second software program, wherein the posted selected data includes processing instructions that determine the operation of the second software program, the second software program operable to receive the posted selected data from the first browser; and
    processing, by the second software program, the received data and generating documents via a data processor by applying a language transformation to a markup language based upon the processing instructions included in the selected posted data and returning the processed data to the first browser in a form that the first browser can readily support.

15. A method according to claim 14 wherein the first software program is a web browser based application.

16. A method according to claim 14 wherein the selected data is posted from the first browser as a Hypertext Transfer Protocol (HTTP) post.

17. A method according to claim 16 wherein the processed data returned from the second software program is returned to the first browser as an HTTP response.

18. A method according to claim 14 wherein the posted selected data from the first software program includes processing instructions and subsequent to receipt of the posted data, the second software program effects the processing instructions contained in the posted data.

19. A method according to claim 14 wherein the data posted from the first software program to the second software program includes return information with respect to returning the user to the first software program, the second software program following the return information subsequent to processing the posted data such that the user is returned to the first software program in accordance with the return information.

20. A method according to claim 19 wherein the return information includes state information and in addition to returning the user to the first software program in accordance with the return information, the second software program returns the user to the first software program in accordance with the received state information.

21. A method according to claim 14 wherein the second software program includes two or more separate second applications and wherein the first software program posts data to each of the two or more separate second applications.

22. A method according to claim 14 wherein the first software programs includes two or more separate first applications and wherein the two or more separate first applications post data to the second software program.

23. A method according to claim 14 wherein the data posted from the first software program is posted to a broker application which receives the data and processes same before subsequently posting the data to the second software program.

24. A method according to claim 23 wherein the processing of data by the broker application places the data in a format suitable for receipt by the second software program.

25. A non-transitory computer readable medium having stored thereon executable instructions for interfacing data between at least a first and second software program, each software program including executable instruction for executing tasks subsequent to a user accessing a computer system and independently satisfying the security requirements to access both the first and second software programs where satisfying security requirements is required, the first software program including executable instructions for, when executed:
selecting data that is available to the first software program;
transmitting the selected data to a first browser and causing the first browser to post the selected data to the second software program, wherein the posted selected data includes processing instructions that determine the operation of the second software program;

the second software program including executable instructions for, when executed:
processing the posted selected data posted from the first browser and generating documents via a data processor by applying a language transformation to a markup language based upon the processing instructions included in the selected posted data; and
returning the processed data to the first browser in a form that the first browser can readily support.

26. A non-transitory computer readable medium according to claim 25 wherein the second software program executable instructions for processing the selected data posted from the first browser and returning processed data to a first browser causes the returned processed data to be posted from the first browser to the first software program.

* * * * *